US00RE38663E

(19) United States
(12) Reissued Patent
Kayani et al.

(10) Patent Number: US RE38,663 E
(45) Date of Reissued Patent: Nov. 30, 2004

(54) METHOD FOR SEMI-CONTINUOUS CURRENCY PROCESSING USING SEPARATOR CARDS

(75) Inventors: Sohail Kayani, Irving, TX (US); Jeffrey Wayne Schild, Irving, TX (US)

(73) Assignee: Currency Systems International, Irving, TX (US)

(21) Appl. No.: 09/894,774

(22) Filed: Jun. 28, 2001

Related U.S. Patent Documents

Reissue of:
(64) Patent No.: 5,917,930
Issued: Jun. 29, 1999
Appl. No.: 08/688,743
Filed: Jul. 31, 1996

(51) Int. Cl.[7] ..... G06K 9/00
(52) U.S. Cl. ..... 382/135; 209/534; 235/379; 434/110; 902/7
(58) Field of Search ..... 382/135–139; 194/206, 328; 209/534; 235/379; 356/71; 902/7; 434/110

(56) References Cited

U.S. PATENT DOCUMENTS

| | | | | | |
|---|---|---|---|---|---|
| 3,222,057 | A | * | 12/1965 | Couri | 271/3.18 |
| 3,304,080 | A | * | 2/1967 | Greenbolt | 271/3.22 |
| 3,759,382 | A | * | 9/1973 | Walkley | 235/379 |
| 3,932,272 | A | * | 1/1976 | Carnes et al. | 209/534 |
| 4,025,420 | A | * | 5/1977 | Horino | 235/379 |
| 4,264,808 | A | * | 4/1981 | Owens | 235/379 |
| 4,357,528 | A | * | 11/1982 | Smith | 235/999.99 |
| 4,465,192 | A | * | 8/1984 | Ohba et al. | 209/534 |
| 4,677,682 | A | * | 6/1987 | Miyagawa et al. | 382/135 |
| 4,845,917 | A | * | 7/1989 | Omura et al. | 53/53 |
| 4,905,839 | A | * | 3/1990 | Yuge et al. | 209/534 |
| 4,905,840 | A | * | 3/1990 | Yuge et al. | 209/534 |
| 5,012,932 | A | * | 5/1991 | Omura et al. | 209/534 |
| 5,022,531 | A | * | 6/1991 | Horino et al. | 209/552 |
| 5,105,364 | A | * | 4/1992 | Kawamura et al. | 700/219 |
| 5,247,159 | A | * | 9/1993 | Yuge | 235/379 |
| 5,419,440 | A | | 5/1995 | Picoult | 209/583 |
| 5,478,992 | A | * | 12/1995 | Hamada et al. | 235/379 |
| 5,692,067 | A | * | 11/1997 | Raterman et al. | 382/135 |

FOREIGN PATENT DOCUMENTS

| | | |
|---|---|---|
| EP | 0 302 458 | 2/1989 |
| JP | 57 212567 | 12/1982 |

OTHER PUBLICATIONS

Pre–Filing Correspondence With Third Parties.
Japanese Laid–Open Publication No. 62–82493.

* cited by examiner

*Primary Examiner*—Jayanti K. Patel
(74) *Attorney, Agent, or Firm*—Colin P. Cahoon; Carstens, Yee & Cahoon, LLP

(57) ABSTRACT

A method of semi-continuous currency processing using separator cards to separate currency stacks in a batch of currency fed into a currency processing machine. This currency processing method uses separator cards that facilitate the continuous processing of individual currency stacks without the necessity of stopping the process between each currency stack. The separator cards used contain features that allow for a positive delineation between individual currency stacks and the association of account data with each individual currency stack and its accompanying separator card as it is processed by the currency processing machine.

23 Claims, 4 Drawing Sheets

METHOD FOR SEMI-CONTINUOUS CURRENCY PROCESSING USING SEPARATOR CARDS

Matter enclosed in heavy brackets [ ] appears in the original patent but forms no part of this reissue specification; matter printed in italics indicates the additions made by reissue.

TECHNICAL FIELD OF THE INVENTION

The field of this invention relates to high-volume currency processing using currency processing machines.

BACKGROUND OF THE INVENTION

Automated, high-volume currency processing is a growing international industry affecting numerous aspects of the distribution, collection, and accounting of paper currency. Currency processing presents unique labor task issues that are interwined with security considerations. Currency processing requires numerous individual tasks; for example; the collection of single notes by a cashier or bank teller, the accounting of individual commercial deposits or bank teller pay-in accounts, the assimilation and shipment of individual deposits or accounts to a central processing facility, the handling and accounting of a currency shipment after it arrives at a processing facility, and the processing of individual accounts through automated processing machines. Any step in the process that can be automated, thereby eliminating the need for a human labor task, saves both the labor requirements for processing currency and increases the security of the entire process. Security is increased when instituting automated processes by eliminating opportunities for theft, inadvertent loss, or mishandling of currency and increasing accounting accuracy.

A highly automated, high-volume processing system is essential to numerous levels of currency distribution and collection networks. Several designs of high-volume processing machines are available in the prior art and used by such varied interests as national central banks, independent currency transporting companies, currency printing facilities, and individual banks. In general, currency processing machines utilizes a conveyor system which transports individual notes past a series of detectors. By way of example, a note may be passed through a series of electrical transducers designed to measure the note's width, length, and thickness. The next set of sensors could be optical sensors recording the note's color patterns. Detectors can likewise be used to detect specific magnetic or other physical characteristics of individual notes.

High volume currency processing machines typically pull individual notes from a stack of currency through a mechanical conveyor past several different detectors in order to facilitate the sorting of the individual notes and the accumulation of data regarding each note fed through the machine. For example, a currency processing machine can perform the simple tasks of processing a stack of currency in order to ensure that it is all of one denomination with proper fitness characteristics while simultaneously counting the stack to confirm a previous accounting. A slightly more complex task of separating a stack of currency into individual denominations while simultaneously counting the currency can be accomplished as well. On the more complex end of the prior art currency processing machines, a stack of currency consisting of various denominations can be fed into the machine for a processing that results in the separation of each denomination, a rejection of any currency that does not meet fitness specifications, the identification of counterfeit bills, and the tracking of individual notes by serial number.

Prior art high-volume currency processing machines are loaded with one single stack of currency, identified to a single set of accounting parameters, before executing the sort process. For example, a stack of currency associated with a specific commercial deposit at a bank may be loaded at the beginning of the currency processing cycle. The currency is then fed into the currency processing machine and sorted based on the needs of the customer. Data obtained from the sort process, for example the number of each denomination note that was detected during the procedure and the total deposit amount, is then compared to the same data identified to the stack of currency prior the processing cycle. However, a need exists for a currency processing method that reduces the labor involved in loading the currency processing machine and improves the security involved in this step. Specifically, a need exists for a method which can process numerous stacks of currency identified to individual accounting parameters one after another without having to wait to reload or stop the machine in order review data collected on each individual account. It is this need which is addressed by the present invention.

SUMMARY OF THE INVENTION

This invention relates to a method of semi-continuous processing of currency using uniquely designed separator cards defining individual accounting subsets of currency within a larger volume batch feed of currency. This invention relates to an improved method of processing currency with high-speed and high-volume currency processing machines such as those presently manufactured and marketed by Currency Systems International of Irving, Tex. The present state of the art utilizes such currency processing machines in batch process feeds of currency. A single stack of currency, identified to a particular set of accounting parameters, is placed into the currency processing machine manually and then processed and sorted by the currency processing machine. For example, one stack of currency may represent a commercial deposit of a single day's cash collection for a single retail store that was deposited to the retail store's local bank. The single stack could also be identified to an individual teller's shift pay-in collections from a single bank after this teller's collections are shipped to a central bank for processing. Data obtained from the currency processing machine sort of a single stack of currency is then retrieved from the machine and the next batch of currency is placed into the machine for the next sorting run. The data retrieved might include the number of each denomination of note processed and the total deposit amount for comparison with the deposit thought to have been made by an individual retail store or associated with an individual teller's collections.

The present invention eliminates the need for individual batch feedings of stacks of currency. With the present invention, individual batch runs of currency can be consolidated into a much larger batch with accounting subsets, such as the single currency stack examples given above, delineated by separator cards with special features. As a result, currency relating to individual accounts can be stacked, without the need for bundling, to make up a much larger batch of currency to be processed. This step can be performed before the currency is even shipped to a central processing location. For example, individual tellers' shift collections for a single branch bank can be stacked into one single batch of currency with each teller's shift account separated by separator cards. Each separator card can be encoded with detailed account information about the stack of currency with which it is associated, or bar code information from the separator card can be identified to the account information of the accompanying stack of currency. The entire batch can now be transported to a central banking location or processing facility. When the currency, now in a large batch, arrives at the processing facility, the currency processing machine operator can load the entire batch into the currency processing machine in one step, rather than loading each teller's account individually. Data assimilated regarding each accounting subset can also be obtained continuously and compared with the detailed account information encoded on or identified to the separator cards without stopping the machine between each currency batch feed. As a result, the proposed invention greatly increases both security and labor savings for high-volume currency sorting operations by eliminating steps in the currency processing system.

Critical goals of this invention include the use of separator cards which a currency processing machine can both easily distinguish from currency and readily identify as a specific separator card associated with a specific stack of currency. The first critical goal, ensuring that the currency processing machine easily and consistently distinguishes between separator cards and currency, is important to maintaining distinct separations between individual accounts as they are fed through the currency processing machine. If a currency processing machine fails to identify a separator card as a break between one currency stack and another, the co-mingling of the currency between the two accounts would be fatal to the accuracy of the processing cycle. Difficult accounting problems could likewise surface if a currency processing machine mistakenly identifies a currency note as a separator card. Another particularly difficult quality control problem involves the misfeed of one or more currency notes simultaneously with a separator card, resulting in the currency and separator card entering the machine while stacked together. The notes in this misfeed stack could mask the separator card from many of the detectors that would otherwise distinguish the card from currency. Therefore, in order to accomplish the first goal of consistent distinguish between a separator card and currency, the separator card of the present invention is designed with unique characteristics which allow for the detection of the separator card even when misfeed with currency notes.

The second critical goal of this invention, that of being able to identify specific account information to each separator card, is a requirement of the semi-continuous processing method described above. When individual account information for a single currency stack can be identified to an individual separator card, either by encoding the separator card with this information or by identifying the information to a unique identifier for each card (such as a unique bar code sequence), individual currency stacks in the batch feed of the currency processing machine can be tracked without the necessity of attempting to identify data accumulated on each stack to the position of the stack in the larger batch feed.

In order to accomplish the two critical goals described above, the present invention utilizes separator cards with several unique characteristics. The two most important of these characteristics are magnetic strips and a means for identifying individual currency stacks to individual separator cards. This identification means may include encoded magnetic strips or bar codes. Other identifying means could included a specific optical pattern sequence, a sequence of holes or slots cut in the card like computer key punch cards, identifying slots or grooves cut into the side of each card, or any other number of means for identifying a specific card by a unique sequence of identifiable characteristics.

Magnetic strips, aside from their use for encoding account information, allow for the currency processing machine to identify a separator card even when the separator card is masked by a misfeed note of currency. This is because the magnetic signature of the strips can be read through notes masking all of the other physical characteristics of the card. The magnetic strips can additionally be encoded with account information or a specific magnetic signature can be recorded prior to the currency processing cycle and identified to accounting data for the accompanying currency stack. Likewise, this latter function of the magnetic strip can be accomplished by the use of bar codes or one of the other means of identifying individual currency stacks to specific separator cards. For example, the accounting data accumulated on a single stack of currency can be identified to a unique bar code number for a specific separator card. This specific separator card can then be placed with that currency stack prior to placing this single accounting subset into the larger batch of currency for processing by a currency processing machine. The separator card can be placed either above the stack of currency as a header card, or below the stack of currency as a trailer card, or both. Once the currency processing cycle has been completed, the currency processing machine can, in turn, identify specific accounting information to the unique bar code number of a specific separator card. This information can be compared to the account information associated with that bar code number prior to the currency processing cycle.

Additional unique characteristics of the separator cards used in the present invention can include separator cards designed with a unique size or dimension, a given thickness, and unique colors or optical patterns. These additional card characteristics provide for redundant confirmation of separator card features versus currency. Once a currency processing machine is configured to detect the several unique characteristics of unique separator cards, the machine can easily distinguish between separator cards and any type of currency. In addition, the currency processing machine can track each individual piece of currency through the detection, imaging, and sorting processing and provide a report on each individual piece of currency correlated to accounting and other data which has been identified to a single separator card.

This present invention is a substantial improvement over the prior art in providing increased speed, accuracy, security, and data management in high-volume currency processing.

BRIEF DESCRIPTION OF THE DRAWINGS

Further objects and advantages of the present invention will become apparent from the following detailed description when read in conjunction with the accompanying drawings, in which.

DETAILED DESCRIPTION OF PREFERRED EMBODIMENT

Figure 1:
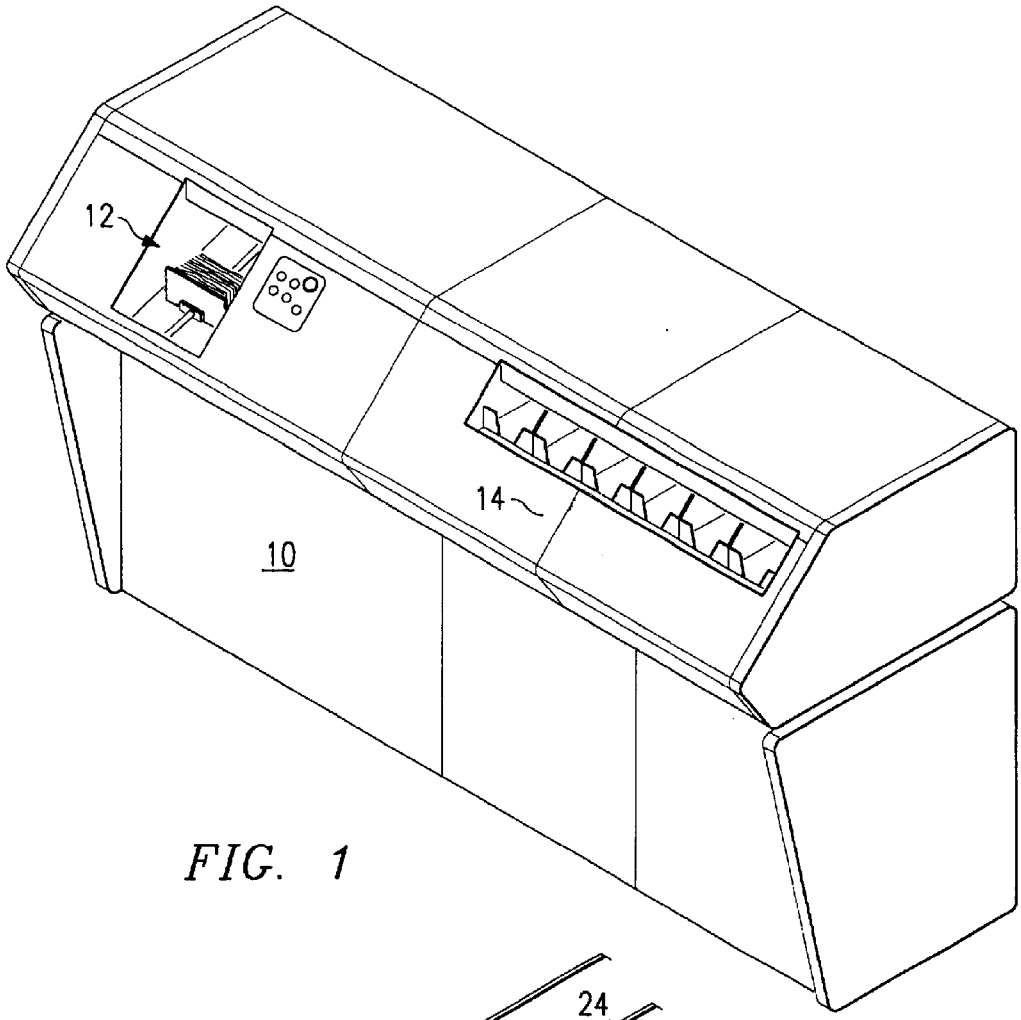
FIG. 1 is a perspective view of a currency processing machine loaded with a stack of currency and separator cards.

FIG. 1 shows a currency processing machine 10 embodying the present invention and loaded with a batch feed of currency 12 prior to starting the currency processing cycle. This batch feed of currency 12 is fed into the currency processing machine one single note at a time. Single notes then travel on a conveyor past several different detectors before being deposited in one of the sort bins 14. Typically, a single sort bin is used to accumulate a single denomination of note at the end of the sort process.

Figure 2:
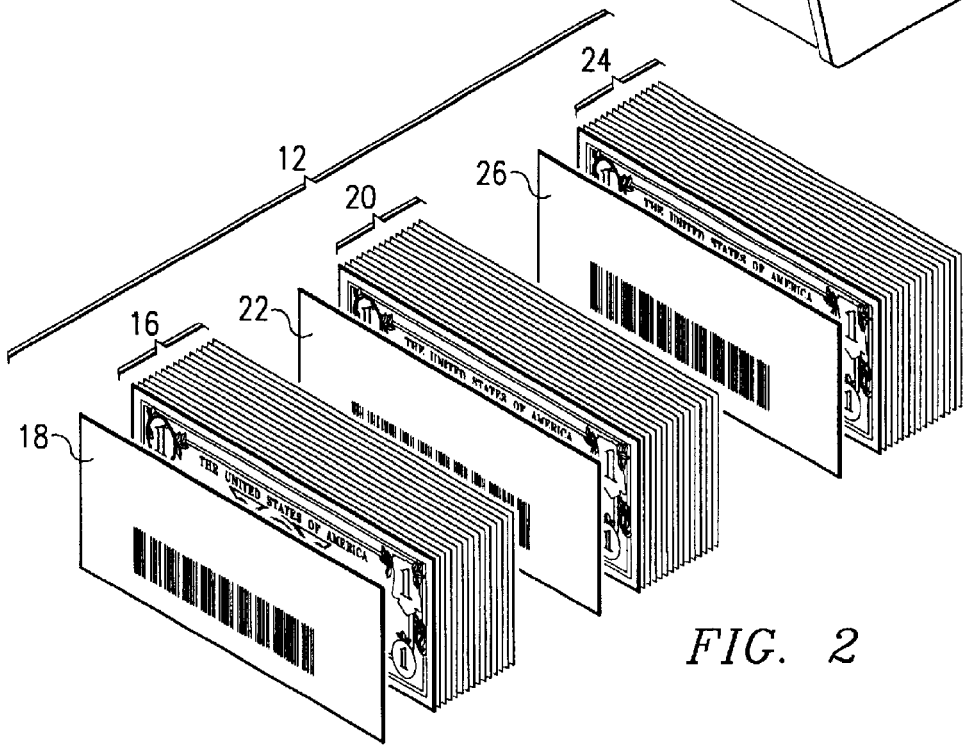
FIG. 2 is a perspective view of a stack of currency divided by separator cards.

FIG. 2 shows a currency batch 12 having several individual currency stacks. The currency batch 12 illustrated consists of a first stack of currency 16, a second stack of currency 20, and a third stack of currency 24. Each stack of currency is accompanied with a separator card 18, 22, 26. In this embodiment, the separator cards 18, 22, 26 are shown as header cards where a first separator card 18 is stacked on top of the first stack of currency 16 and would identify the first stack of currency 16 during the currency processing cycle. Likewise, a second separator card 22 is stacked on top of a second stack of currency 20 and identifies the second stack of currency during the currency processing cycle. It is understood that the present invention contemplates that numerous currency stacks 16, 20, 24 such as the three depicted can be successively stacked to form a large batch feed 12 prior to insertion in the currency processing machine 10. It is also understood that an alternative embodiment from that depicted in FIG. 2 could use separator cards 18, 22, 26 at the end of each stack of currency 16, 20, 24, called trailer cards. A third embodiment could use both header cards and trailer cards to separate the currency stacks 16, 20, 24.

Figure 3A:
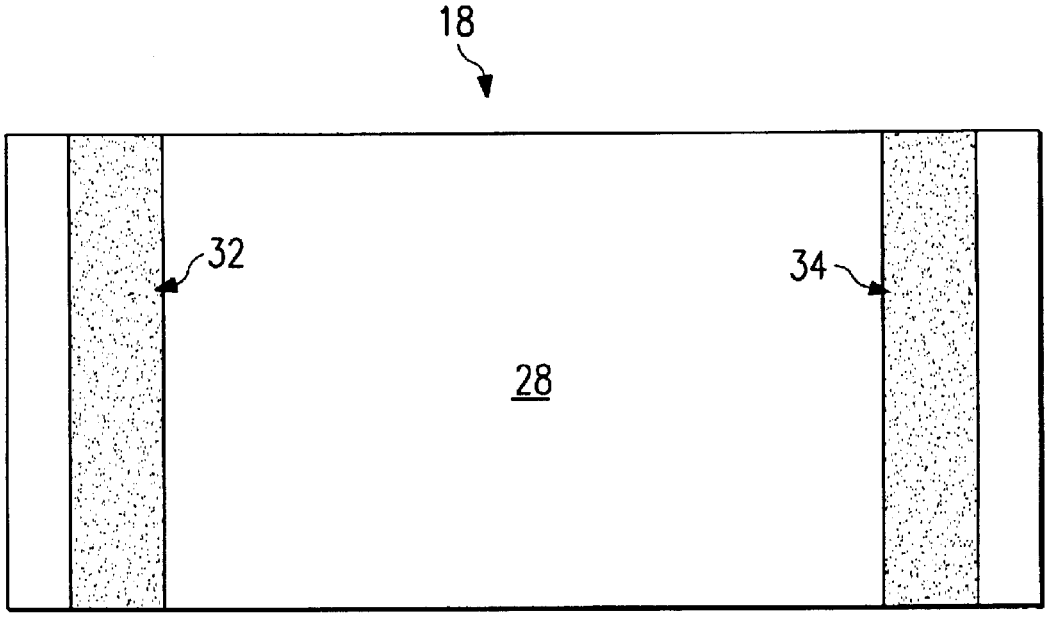
FIG. 3A is a perspective view of the front of an exemplar separator card.
Figure 3B:
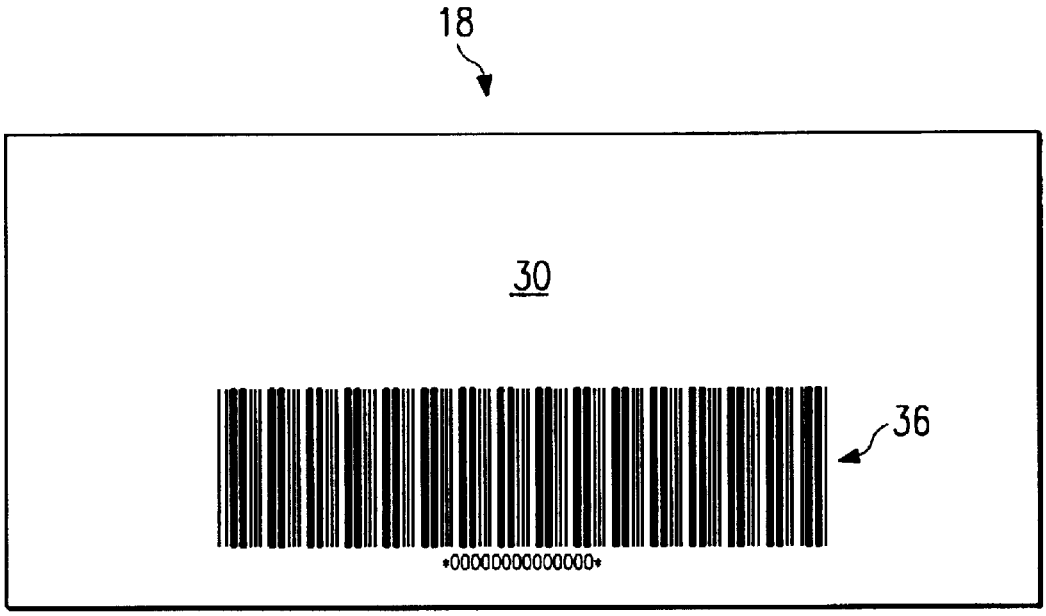
FIG. 3B is a perspective view of the back of an exemplar separator card.

FIGS. 3A and 3B depict an exemplar separator card 18 of the present invention. FIG. 3A shows the first side 28 of the separator card 18, while FIG. 3B shows the second side 30 of the separator card 18. In the embodiment shown by FIGS. 3A and 3B, the first side 28 is overlaid with a first magnetic strip 32 and a second magnetic strip 34. The second side 30 is imprinted with a bar code 36. As will be described in more detail below, this embodiment allows for accurate identification of a separator card 18 primarily by detection of the two magnetic strips 32, 34, while accounting data on an individual stack of currency can be identified to a specific bar code number encoded on the bar code 36 of the separator card 18.

Figure 4:
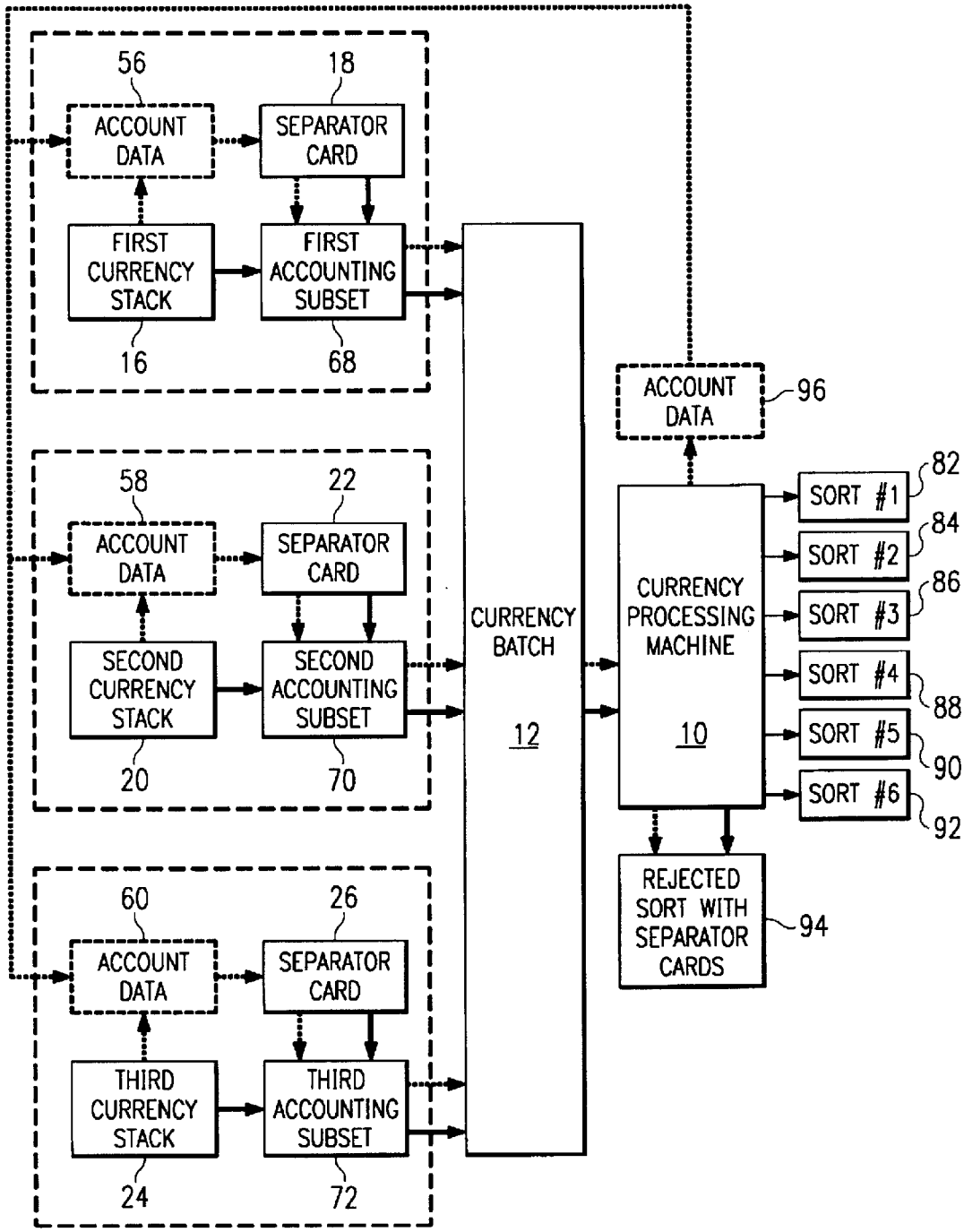
FIG. 4 is a flow cart of a method for processing currency utilizing separator cards.

FIG. 4 shows a flowchart of a method of processing currency utilizing separator cards. Using the same exemplar batch of currency 12 shown in FIG. 2, FIG. 4 shows three individual currency stacks 16, 20, 24. Account data 56, 58, 60 associated with each currency stack 16, 20, 24 is first recorded for each account. This account data 56, 58, 60 might include the number of individual currency notes, the total currency value, and the identity of the currency stack to a single commercial deposit or bank teller's shift. The account data 56, 58, 60 is then associated with a separator card 18, 22, 26, which will accompany an individual currency stack 16, 20, 24. This account data can be identified to a separator card by either identifying a bar code number unique to the specific separator card to the account data or by encoding the account data information directly on to the separator card. The physical combination of separator cards 18, 22, 26 and the currency stacks 16, 20, 24 form what is shown as single accounting subsets 68, 70, 72. These accounting subsets 68, 70, 72 can then be stacked into a currency batch 12. This currency batch 12 is fed into a currency processing machine 10.

During the currency processing cycle individual notes from each accounting subset 68, 70, 72 are sorted into sort bins 82, 84, 86, 88, 90, 92. Typically, these sort bins are used to bundle individual denomination notes. For example, the first sort bin 82 may be designated to accumulate $1.00 notes, while the second sort bin 84 may be designated to accumulate $5.00 notes. FIG. 4 shows a separate bin 94 for a rejected sort with the separator cards. This rejected sort bin 94 could be designated to hold any counterfeit currency detected during the currency sort process. By depositing the counterfeit currency with the separator cards 18, 22, 26, a quick physical check can be made to determine which single accounting subset 68, 70, 72 is associated with the counterfeit notes found to follow a specific separator card 18, 22, 26.

Account data 96 for each accounting subset 68, 70, 72 is accumulated during the currency processing cycle. This account data 96 can then be compared with similar account data 56, 58, 60 which was originally collected for each individual currency stack 16, 20, 24. For example, while processing the first accounting subset 68, the currency processing machine can accumulate information on the number of each denomination of note processed and the total currency value of the notes associated with the first accounting subset 68. This account data 96 accumulated on the first accounting subset 68 can then be compared to the account data 56 associated with the first currency stack 16 prior to the consolidation of the accounting subset 68, 70, 72 into the currency batch 12.

Figure 5:
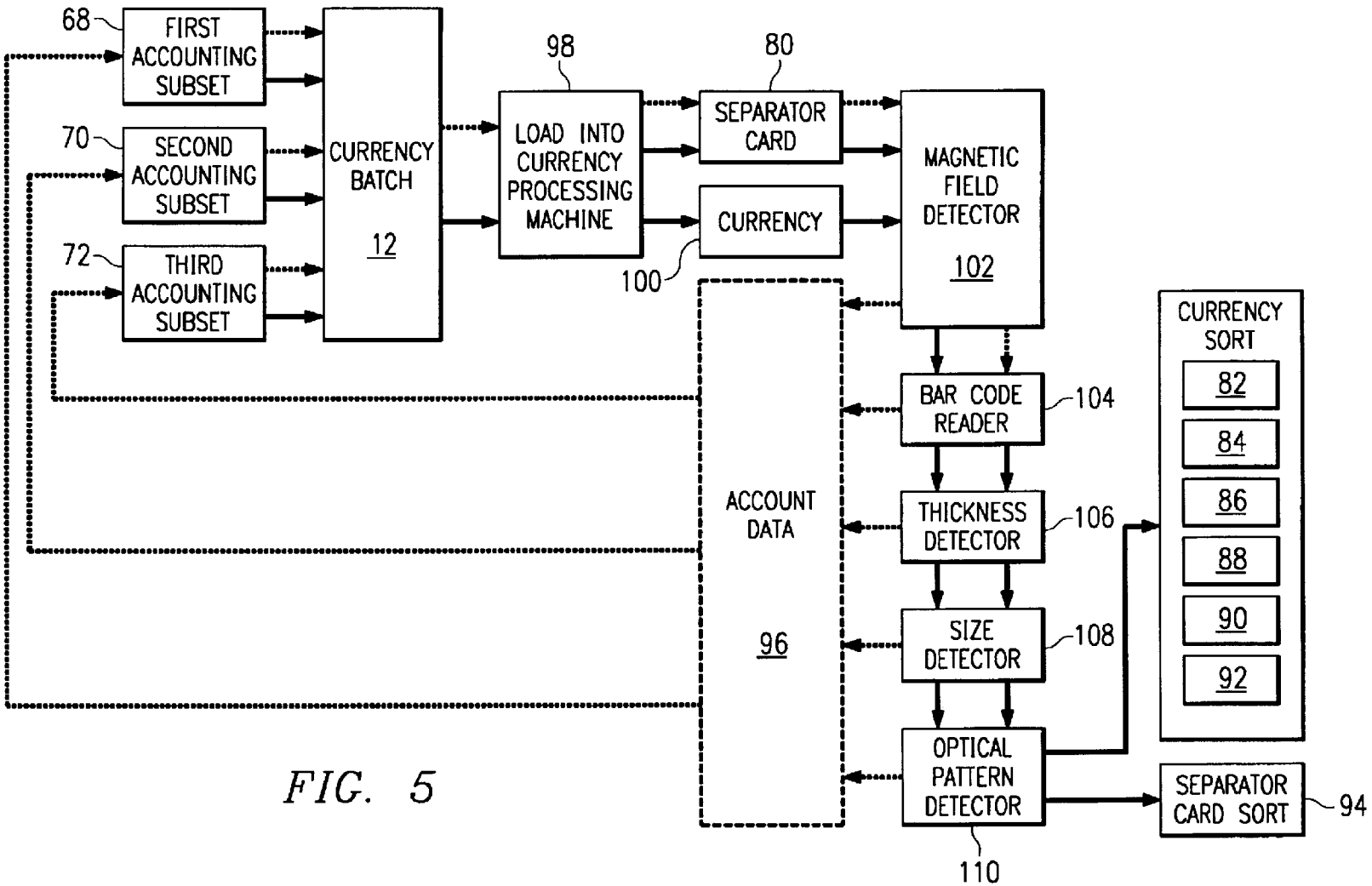
FIG. 5 is a flow chart of a method for identifying separator cards used by currency processing machines.

FIG. 5 shows a flow chart of a method for identifying separator cards used by currency processing machines. FIG. 5 starts with the single accounting subset 68, 70, 72, that are likewise shown on FIG. 4. These accounting subsets 68, 70, 72 are stacked to form a currency batch 12. This currency batch is then loaded into the currency processing machine 98. The top item off the currency batch 12, whether it is a separator card 80 or currency 100, is then pulled into a conveyor past several detectors.

The first detector shown in FIG. 5 is a magnetic field detector 102. This magnetic field detector can detect a unique magnetic strip on a separator card 80 in order to assist the currency processing machine in delineating between separator cards 80 and currency 100. This can be accomplished even in the event of a misfeed which results in a currency note 100 masking other physical features of the separator card 80, since the magnetic field of the separator card 80 can be read through the masking currency 100. The currency processing machine can be designated to read the individual serial number on the note masking what it detects to be a concurrently stacked separator card 80. The information obtained by the magnetic field detector on the separator card, as well as information obtained on the masking note throughout the following detectors, allows for a reconstruction of the misfeed and avoids co-mingling of the accounting subsets 68, 70, 72 during the currency processing cycle.

The next detector depicted in FIG. 5 is a bar code reader 104. This bar code reader identifies the specific bar code number for each individual separator card 80 read. The bar code number is then identified by the currency processing machine with the currency 100 that follows the specific separator card 80. The separator card 80 or currency 100 then passes through one or more detectors designed to measure the thickness and size of the item on the conveyor, as depicted in FIG. 5 by a thickness detector 106 and a size detector 108. This information can be of additional use to the currency processing machine in distinguishing between a separator card 80 and currency 100. The final detector shown in FIG. 5 is an optical pattern detector 110. This optical pattern detector 110 can likewise assist in the process of delineating between a separator card 80 and currency 100, both having unique color characteristics and patterns.

It is understood that the order and type of detectors shown in FIG. 5 represent only one example of a preferred embodiment for the method described. The detectors used in the present invention could be arranged in many different sequences. In addition, other types of detectors can be used to record various characteristics of currency and separator cards.

After passing through the currency processing machine, the currency 100 is deposited in the appropriate sort bin 82, 84, 86, 88, 90, 92 as a part of the currency sort process. The separator card, likewise is directed to the separator card sort bin 94.

Account data 96 controlled by the currency processing machine on each accounting subset 68, 70, 72 can be compared to similar account data that was associated with the accounting subset 68, 70, 72 prior to the consolidation of these accounts into the currency batch 12. As shown in FIG. 5, the account data 96 collected during the currency processing cycle is assimilated from information provided by the various detectors 102, 104, 106, 108, 110.

The preferred embodiment illustrated in FIG. 5 can additionally detect sequencing errors between separator cards 80 and currency notes 100. For example, when the accounting subsets 68, 70, 72 are comprised of currency stacks separated by header cards, the first item processed through the sequence shown in FIG. 5 should be a separator card 80. The next item processed should be currency 100. If a separator card 80 is detected immediately following the processing of another separator card 80, this event would be identified as a sequencing error which might be traced to improper stacking of the accounting subsets 68, 70, 72. Sequencing errors could likewise be detected when the separator card 80 is a trailer card. The most accurate detection of sequencing errors, however, occurs when the preferred embodiment utilizes both header and trailer cards with each accounting subset 68, 70, 72. The use of both header and trailer cards requires, in sequence, that the first separator card 80 processed for an accounting subset 68, 70, 72 is a header card. The next item processed should be currency 100. The next separator card 80 detected should be a trailer card. A trailer card would then be immediately followed by a header card for the next accounting subset. Any deviations from the above described sequence would, again, indicate a sequencing error that might be attributable to improper stacking of separator cards 80 and currency 100 in the accounting subsets 68, 70, 72.

It would be understood that various changes in the details, materials, and arrangements of the processes which have been described and illustrated in order to explain the nature of the invention, may be made by those skilled in the art within the principle and scope of the invention as expressed in the following claims.

We claim:

1. A method of semi-continuous processing of currency, said currency having at least one denomination and authenticating attributes, using a currency processing machine, comprising the steps of:

(a) separating at least one currency stack with at least one separator card, wherein said separator card is encoded with account information prior to processing the currency stack;

(b) identifying said currency stack with information encoded on said separator card; and (c) feeding said currency stack and separator card into said currency processing machine*; and,*

(*d*) *processing the separator card and currency notes using processing steps common to both.*

[2. The method of claim 1 further comprising the step of:

(d) processing the separator card and currency notes using processing steps common to both.]

3. The method of claim 1 further comprising the step of:

[(d)] (*e*) verifying the authenticity of each currency note within said currency stack;

[(e)] (*f*) separating non-authentic currency; and,

[(f)] (*g*) associating said non-authentic currency with an initial currency stack and separator card.

4. The method of claim 3 wherein step [(f)] (*g*) is accomplished by stacking non-authentic currency with a corresponding separator card as a last processing step.

5. The method of claim 3 wherein step [(f)] (*g*) is accomplished by identifying the non-authentic currency to the account information encoded a step (a).

6. The method of claim 1 further comprising:

[(d)] (*e*) sorting said currency by denomination into a plurality of slots in said machine;

[(e)] (*f*) sorting an accounting of said currency in a memory of said machine; and,

[(f)] (*g*) comparing said accounting of step [(e)] (*f*) with the account information encoded at step (a).

7. The method of claim 1 wherein step (a) further comprises separating at least one currency stack with a separator card having a magnetic strip.

8. The method of claim 1 wherein step (a) further comprises separating at least one currency stack with a separator card imprinted with a bar code series.

9. The method of claim [2] *1* wherein step (a) further comprises separating at least one currency stack with a separator card having at least one characteristic feature enabling the currency processing machine to identify the separator card when a misfeed occurs at step (c) resulting in at least one note masking the separator card during the processing of step (d).

10. The method of claim 9 wherein said characteristic feature comprises a magnetic strip.

11. The method of claim 1 wherein step (a) further comprises encoding accounting information including an initial count of the value of said currency stack and a source for said currency stack.

12. The method of claim 11 further comprising:

(d) comparing the initial count with a post-processing count.

13. The method of claim 1 wherein step (a) further comprises placing said separator card as a header card.

14. The method of claim 1 wherein step (a) further comprises plurality said separator card as a trailer card.

15. The method of claim 1 wherein step (a) further comprises placing one of said cards as a header card and placing one of said cards as a trailer card.

16. The method of identifying a separator card used to delineate and track a stack of currency in a currency batch fed into a currency processing machine, said method comprising the steps of:

(a) encoding account data for said currency stack to said separator card prior to processing said currency stack;

(b) passing the separator card through at least one detector which detects at least one card characteristic; and, (c) distinguishing between said separator card and said currency based on the detected characteristics.

17. The method of claim 16 wherein step (b) further comprises passing the separator card through a detector which detects magnetic card characteristics.

18. The method of claim 16 wherein step (b) further comprises passing the separator card through a detector which detects optical pattern card characteristics.

19. The method of claim 16 wherein step (b) further comprises passing the separator card through a detector which detects physical dimension card characteristics.

20. The method of claim 16 wherein step (b) further comprises passing the separator card through a detector which detects color card characteristics.

21. The method of claim 16 wherein step (c) further comprises distinguishing between said separator card and said currency when said separator card is masked by a currency note due to a misfeed.

22. A separator card having two sides and used for currency processing, said card comprising:

a bar code feature imprinted on at least one side with account information;

at least one magnetic strip imprinted on at least one side such that the separator card can be identified during currency processing when masked because of a misfeed by at least one note.

*23. A method of semi-continuous processing of currency, said currency having at least one denomination and authenticating attributes, using a currency processing machine, comprising the steps of:*

(*a*) *separating at least one currency stack with at least one separator card, wherein said separator card is encoded with account information prior to processing the currency stack;*

(*b*) *identifying said currency stack with information encoded on said separator card;*

(*c*) *feeding said currency stack and separator card into said currency processing machine; and,*

(*d*) *verifying the authenticity of each currency note within said currency stack;*

(*e*) *separating non-authentic currency; and,*

(*f*) *associating said non-authentic currency with an initial currency stack and separator card.*

*24. A method of semi-continuous processing currency, said currency having at least one denomination and authenticity attributes, using a currency processing machine, comprising the steps of:*

(*a*) *separating at least one currency stack with at least one separator card, wherein said separator card is encoded with account information prior to processing the currency stack;*

(*b*) *identifying said currency stack with information encoded on said separator card;*

(*c*) *feeding said currency stack and separator card into said currency processing machine; and,*

(*d*) *sorting said currency by denomination into a plurality of slots in said machine;*

(*e*) *sorting an accounting of said currency in a memory of said machine; and*

(*f*) *comparing said accounting of step* (*e*) *with the account information encoded at step* (*a*).

* * * * *

UNITED STATES PATENT AND TRADEMARK OFFICE

CERTIFICATE OF CORRECTION

PATENT NO. : RE 38,663 E
DATED : November 30, 2004
INVENTOR(S) : Kayani et al.

It is certified that error appears in the above-identified patent and that said Letters Patent is hereby corrected as shown below:

Column 10,
Lines 10-30, Claim 24, should read

24. A method of semi-continuous processing of currency, said currency having at least one denomination and authenticity attributes, using a currency processing machine, comprising the steps of:

(a) separating at least one currency stack with at least one separator card, wherein said separator card is encoded with account information prior to processing the currency stack;

(b) identifying said currency stack with information encoded on said separator card;

(c) feeding said currency stack and separator card into said currency processing machine;

(d) sorting said currency by denomination into a plurality of slots in said machine;

(e) sorting an accounting of said currency in a memory of said machine; and (f) comparing said accounting of step (e) with the account information encoded at step (a).

Signed and Sealed this

Nineteenth Day of April, 2005

JON W. DUDAS
*Director of the United States Patent and Trademark Office*